United States Patent
Washecheck

[15] 3,692,810
[45] Sept. 19, 1972

[54] CATALYTIC OXIDATION OF OLEFINS TO YIELD CARBOXYLIC ACIDS

[72] Inventor: Paul H. Washecheck, Ponca City, Okla.

[73] Assignee: Continental Oil Company, Ponca City, Okla.

[22] Filed: Feb. 22, 1971

[21] Appl. No.: 117,794

[52] U.S. Cl. .............................. 260/413, 260/533 R
[51] Int. Cl. ............................................. C07c 51/32
[58] Field of Search .......................... 260/533 R, 413

[56] References Cited

UNITED STATES PATENTS 3,409,649  11/1968  Keblys et al. ........ 260/533 R X
3,076,032  1/1963  Riemenschneider et al. ....260/533 R X Primary Examiner—Lorraine A. Weinberger
Assistant Examiner—Richard D. Kelly
Attorney—Joseph C. Kotarski, Henry H. Huth, Robert B. Coleman, Jr. and Gerald L. Floyd

[57] ABSTRACT

Olefins are oxidized with a mineral acid to carboxylic acids by dissolving the olefin in a hydrophobic solvent, and contacting the olefin solution with an oxidation system which comprises a mineral acid, an aqueous solution of a hexavalent chromium compound and a ruthenium compound. The reaction mixture is heated to a temperature of from about 45° C to about 100° C.

11 Claims, No Drawings

CATALYTIC OXIDATION OF OLEFINS TO YIELD CARBOXYLIC ACIDS

BACKGROUND OF THE INVENTION

1. Field of the Invention

This invention relates to the catalytic oxidation of olefins to produce carboxylic acids. In particular, the invention relates to the use of a new catalyst system for oxidizing olefins.

2. Brief Description of the Prior Art

It has been proposed to oxidize olefins to aldehydes and/or carboxylic acids using periodic acid in the presence of ruthenium. The iodine yielded in the reaction is, however, an expensive chemical and must be recovered substantially quantitatively in order to render the process economically attractive. This is difficult due to the high vapor pressure of iodine, its solubility in organic solvents and its reactivity with many organic compounds.

Another method previously disclosed (in U. S. Pat. No. 3,076,032) for oxidizing olefins to carbonyl compounds is that of contacting the olefins with an acid, such as a mineral acid, a compound of one of the noble metals belonging to group VIII of the periodic table, and a redox system which includes an inorganic salt of a metal showing several valence states under the reaction conditions, such as chromium. The contact is carried out in an aqueous or hydrophilic solvent environment, and in the presence of a quinone compound. The group VIII noble metals are reported to function as equivalents in the oxidation reaction, both with respect to the aldehyde and ketone products yielded, and with respect to their susceptibility to regeneration by a number of described redox systems, one of which, besides the chromium or compounds previously mentioned, is an $Fe^{+3}$—$O_2$ redox system.

SUMMARY OF THE PRESENT INVENTION

The present invention proposes the use of a new catalyst system for oxidizing olefins, and a new method, employing such catalytic oxidation, for producing good yields of carboxylic acids. The method of the present invention departs from the prior art in its discernment of a difference in the catalytic effect of a particular group VIII metal, ruthenium, in the oxidation of olefins, as compared to other group VIII metals, such as palladium and osmium. Moreover, it has been determined that the redox system in which the ruthenium may be included for purposes of regeneration during the oxidation of olefins is not as comprehensive as for some other group VIII metals, such as palladium. Thus, hexavalent chromium functions well as a regenerative oxidant for ruthenium, whereas ferric iron systems are ineffective. Finally, though such group VIII metals as palladium and osmium, in combination with a suitable redox system, do yield aldehydes, and more frequently, ketones, upon oxidation of olefins, they do not yield carboxylic acids, and are not the equivalent of the ruthenium-chromium system which does yield the latter materials.

Broadly described, the present invention comprises a method for producing carboxylic acids by contacting olefins, while in solution in a hydrophobic (water-immiscible) solvent, with an oxidation system which comprises an aqueous solution of a hexavalent chromium compound, a mineral acid and a ruthenium compound. The reaction mixture is heated to a temperature of from about 45° C to about 100° C, and preferably to the reflux temperature of the hydrophobic solvent in which the olefin is dissolved.

An object of the invention is to provide a new method for preparing carboxylic acids.

Another object of the invention is to provide a catalyst system for selectively oxidizing olefins to carboxylic acids.

A further object of the invention is to provide a method for catalytically oxidizing olefins so that the more expensive elements of the catalyst can be recovered or re-utilized in a relatively economical manner.

Other objects and advantages of the invention will become apparent as the following detailed description of the invention is read.

DETAILED DESCRIPTION OF THE INVENTION

The olefins oxidized by contact with the oxidation system used in the process of the invention may be 1-olefins or internal olefins, and may be cyclic or acyclic (straight or branched chain). The olefin is dissolved in a hydrophobic solvent which is substantially immiscible with water. Solvents which may be used include, for example, paraffin hydrocarbons, both halogenated and non-halogenated, ketones, benzene and toluene. Many others might be mentioned, but will be known or easily ascertainable by those possessing chemical expertise.

The oxidation system with which the olefin solution is contacted consists essentially of a ruthenium compound, a mineral acid and an aqueous solution of a compound of hexavalent chromium. The ruthenium may be present in a number of forms, such as, for example, the metal, ruthenium dioxide, ruthenium tetroxide or a ruthenium halide salt. Only a relatively small amount of ruthenium need be utilized in the catalyst system. In general, from about 0.001 mole to about 0.01 mole of ruthenium is utilized per mole of the olefin subjected to oxidation. The use of from about 0.004 mole to about 0.008 mole of ruthenium is preferred.

The mineral acid used in the oxidation system may be substantially any mineral acid. Typical useful mineral acids include nitric acid, hydrochloric acid, sulphuric acid, perchloric acid, and phosphoric acid. The amount of mineral acid employed is not critical and may vary widely. The strength of the mineral acid may also vary over a considerable range, but is preferably from about 2 molar to about 8 molar.

The form in which hexavalent chromium is present is not critical, provided it is present in aqueous solution. Although an aqueous solution of chromium trioxide may be very conveniently utilized, aqueous solutions of other chromium salts may also be used, or the hexavalent chromium ions may be electrolytically regenerated in the course of the oxidation reaction. The amount of chromium utilized may vary from about 1 mole to about 50 moles per mole of olefin subjected to oxidation, and an amount of about 10 moles of the chromium per mole of olefin is preferred.

In the process of the invention, the ruthenium functions to oxidize the olefin starting material to the corresponding carboxylic acids according to the reaction

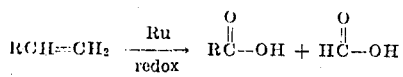

$$RCH=CH_2 \xrightarrow[\text{redox}]{Ru} R\overset{O}{\overset{\|}{C}}-OH + H\overset{O}{\overset{\|}{C}}-OH$$

In oxidizing the olefin, the ruthenium undergoes reduction from a higher to a lower valence state, and is then regeneratively oxidized by the hexavalent chromium. Hexavalent chromium is itself capable of oxidizing olefins at a slow rate to provide a low yield of impure carboxylic acids contaminated with epoxides and other by-products, and to avoid this undesirable oxidative effect of the chromium, the olefin is dissolved in a hydrophobic solvent (in which the chromium is substantially insoluble), and the chromium compound is dissolved in an aqueous or hydrophilic solvent.

The mineral acid utilized functions to contribute anions to the reaction environment to form salts on solution of chromium trioxide.

The oxidation reaction is carried out at a temperature of from about 40° C to about 100° C, with operation at the reflux temperature of the particular reaction system in use being preferred.

The following example will serve to illustrate typical oxidation reactions carried out in accordance with the process of the invention. A number of oxidation runs were carried out in a three-necked flask equipped with a blade stirrer, a thermometer and a condenser. In each reaction run, 500 ml of an aqueous mineral acid solution (type and concentration varied between runs) and 50 grams (0.50 mole) of chromium trioxide was placed in the flask. The amount of ruthenium dioxide to be used as catalyst was then placed in the flask. A n-heptane solution of 11.22 grams (0.10 mole) of 1-octene was next added to the flask. The reaction mixture was then heated to gentle reflux at 82° C.

In each run, the reaction mixture was sampled periodically and analyzed by gas chromatography. The concentration of each component was calculated from a standard solution using the heptane solvent as an internal standard. The results reported in Table I are the analyses of the last samples before the reaction was stopped in each run.

utilized without departure from the described basic principles. Changes and substitutions of this sort are therefore deemed to be circumscribed by the spirit and scope of the invention except as the same may be limited by the appended claims or reasonable equivalents thereof.

What is claimed is:

1. The method of preparing carboxylic acids which comprises contacting a solution of an olefin in a hydrophobic solvent with an oxidation system consisting essentially of an aqueous solution of a hexavalent chromium compound, a catalytic material selected from the group consisting of ruthenium metal and ruthenium compounds, and a mineral acid, said contact being carried out at a temperature of from about 45° C to about 100° C.

2. The method defined in claim 1 wherein said contact is carried out at the reflux temperature of the reaction mixture.

3. The method defined in claim 1 wherein the amount of ruthenium in said oxidation system is from about 0.001 mole to about 0.01 mole per mole of the olefin with which the oxidation system is contacted.

4. The method defined in claim 1 wherein said mineral acid is selected from the group consisting of sulfuric acid, nitric acid, and perchloric acid.

5. The method defined in claim 1 wherein the amount of hexavalent chromium in said oxidation system is from about 1 mole to about 50 moles per mole of the olefin with which the oxidation system is contacted.

6. The method defined in claim 1 wherein said hydrophobic solvent is an organic liquid which is immiscible with water.

7. The method defined in claim 5 wherein said hexavalent chromium compound is chromium trioxide and said catalytic material is ruthenium dioxide.

8. The method defined in claim 7 wherein the amount of ruthenium in said oxidation system is from about 0.001 mole to about 0.01 mole per mole of the olefin with which the oxidation system is contacted.

TABLE I

| Run No. | $RuO_2$, moles×$10^4$ | Moles of mineral acid | | | Reaction time, hrs. | 1-octene,[a] percent conversion | Percent selectivity acids[b] | | | Percent yield[c] |
|---|---|---|---|---|---|---|---|---|---|---|
| | | $H_2SO_4$ | $HClO_3$ | $HNO_3$ | | | $C_6$ | $C_7$ | Total | |
| 1 | | 2.0 | | | 120 | 39.4 | 1.7 | 42.7 | 43.4 | 17.1 |
| 2 | 4.0 | 2.0 | | | 24 | 96.5 | 5.6 | 83.0 | 88.0 | 84.9 |
| 3 | | 4.0 | | | 48 | 85.7 | 10.3 | 71.9 | 82.2 | 70.4 |
| 4 | 4.0 | 4.0 | | | 4 | 100.0 | 14.2 | 71.7 | 85.9 | 85.9 |
| 5 | 8.0 | 4.0 | | | 2 | 98.3 | 14.8 | 75.1 | 89.9 | 88.4 |
| 6 | | 6.0 | | | 24 | 49.5 | 3.2 | 7.3 | 10.5 | 5.2 |
| 7 | 4.0 | 6.0 | | | 1 | 97.6 | 14.2 | 43.0 | 57.2 | 55.8 |
| 8 | 4.0 | 2.0 | | | 24 | 96.5 | 5.6 | 83.0 | 88.0 | 84.9 |
| 9 | 4.0 | 4.0 | | | 4 | 100.0 | 14.2 | 71.7 | 85.9 | 85.9 |
| 10 | 4.0 | 6.0 | | | 1 | 97.6 | 14.2 | 43.0 | 57.2 | 55.8 |
| 11 | 4.0 | | 2.0 | | 48 | 73.8 | 8.4 | 79.1 | 87.5 | 64.6 |
| 12 | 4.0 | | 4.0 | | 8 | 100.0 | 13.8 | 64.4 | 78.2 | 78.2 |
| 13 | 4.0 | | 6.0 | | 1 | 85.9 | 14.7 | 34.8 | 49.5 | 42.5 |
| 14 | 4.0 | | | 2.0 | 48 | 85.0 | 5.9 | 75.5 | 81.4 | 69.2 |
| 15 | 4.0 | | | 4.0 | 6 | 98.4 | 7.8 | 78.5 | 86.3 | 84.9 |

[a] Octene conversion=1-octene consumed/1-octene charged.
[b] Percent selectivity=weight of acid produced/(theoretical weight of acid possible) (conversion).
[c] Percent yield=percent conversion times percent selectivity.

From the foregoing description of the invention, it will be apparent that a process of realizing high yields of carboxylic acids from olefinic starting materials has been proposed. Although certain preferred reaction conditions and typical reactants have been described for the purpose of illustrating the basic principles of the invention, it will be understood that changes in such conditions, and equivalents of the reactants, may be 9. The method defined in claim 8 wherein the olefin is a 1-olefin.

10. The method defined in claim 9 wherein said hydrophobic solvent is an organic compound which is immiscible with water.

11. The method defined in claim 10 wherein said mineral acid is selected from the group consisting of sulfuric acid, nitric acid, and perchloric acid.

* * * * *